(12) United States Patent
Rodriguez et al.

(10) Patent No.: US 7,831,481 B2
(45) Date of Patent: Nov. 9, 2010

(54) E-COMMERCE TRANSACTION AGGREGATION AND PROCESSING

(75) Inventors: Herman Rodriguez, Austin, TX (US); Newton James Smith, Austin, TX (US); Clifford Jay Spinac, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 830 days.

(21) Appl. No.: 11/559,593

(22) Filed: Nov. 14, 2006

(65) Prior Publication Data

US 2007/0061223 A1 Mar. 15, 2007

Related U.S. Application Data

(62) Division of application No. 10/733,836, filed on Dec. 11, 2003, now Pat. No. 7,519,547.

(51) Int. Cl.
G06Q 30/00 (2006.01)

(52) U.S. Cl. .................. 705/26; 705/1; 705/27; 709/217

(58) Field of Classification Search .................. 705/26, 705/27, 1; 709/217
See application file for complete search history.

(56) References Cited

U.S. PATENT DOCUMENTS

| | | | |
|---|---|---|---|
| 5,484,988 A | 1/1996 | Hills et al. | |
| 6,164,528 A | 12/2000 | Hills et al. | |
| 6,283,366 B1 | 9/2001 | Hills et al. | |
| 6,354,491 B2 | 3/2002 | Nichols et al. | |
| 2001/0023402 A1* | 9/2001 | Flynn | 705/1 |
| 2001/0034609 A1* | 10/2001 | Dovolis | 705/1 |
| 2002/0152137 A1* | 10/2002 | Lindquist et al. | 705/27 |
| 2002/0156683 A1 | 10/2002 | Stoutenburg et al. | |
| 2002/0156688 A1* | 10/2002 | Horn et al. | 705/26 |
| 2003/0014368 A1 | 1/2003 | Leurig et al. | |

* cited by examiner

*Primary Examiner*—Yogesh C Garg
(74) *Attorney, Agent, or Firm*—Libby Z. Toub; Schubert Law Group PLLC

(57) ABSTRACT

Methods, systems, and media for aggregating and processing product information are disclosed. Embodiments include hardware and/or software for receiving an electronic receipt from a merchant that describes a transaction for a product by a purchaser and gathering product information from one or more sources such as the merchant, the product's manufacturer, the purchaser's bank, and/or an accessories dealer. Upon gathering the product information, the product information is associated with the transaction for the product on the electronic receipt and packaged in a standard, electronic format, an aggregated package, that is accessible and manageable by the purchaser's software, such as a personal finance manager (PFM) like Quicken™, Quickbooks™, Microsoft Money™, or the like. The aggregated package can then be sent to the purchaser via an email address supplied by the purchaser at the time of the purchaser or by the purchaser's bank while completing a funds transfer for the transaction.

19 Claims, 4 Drawing Sheets

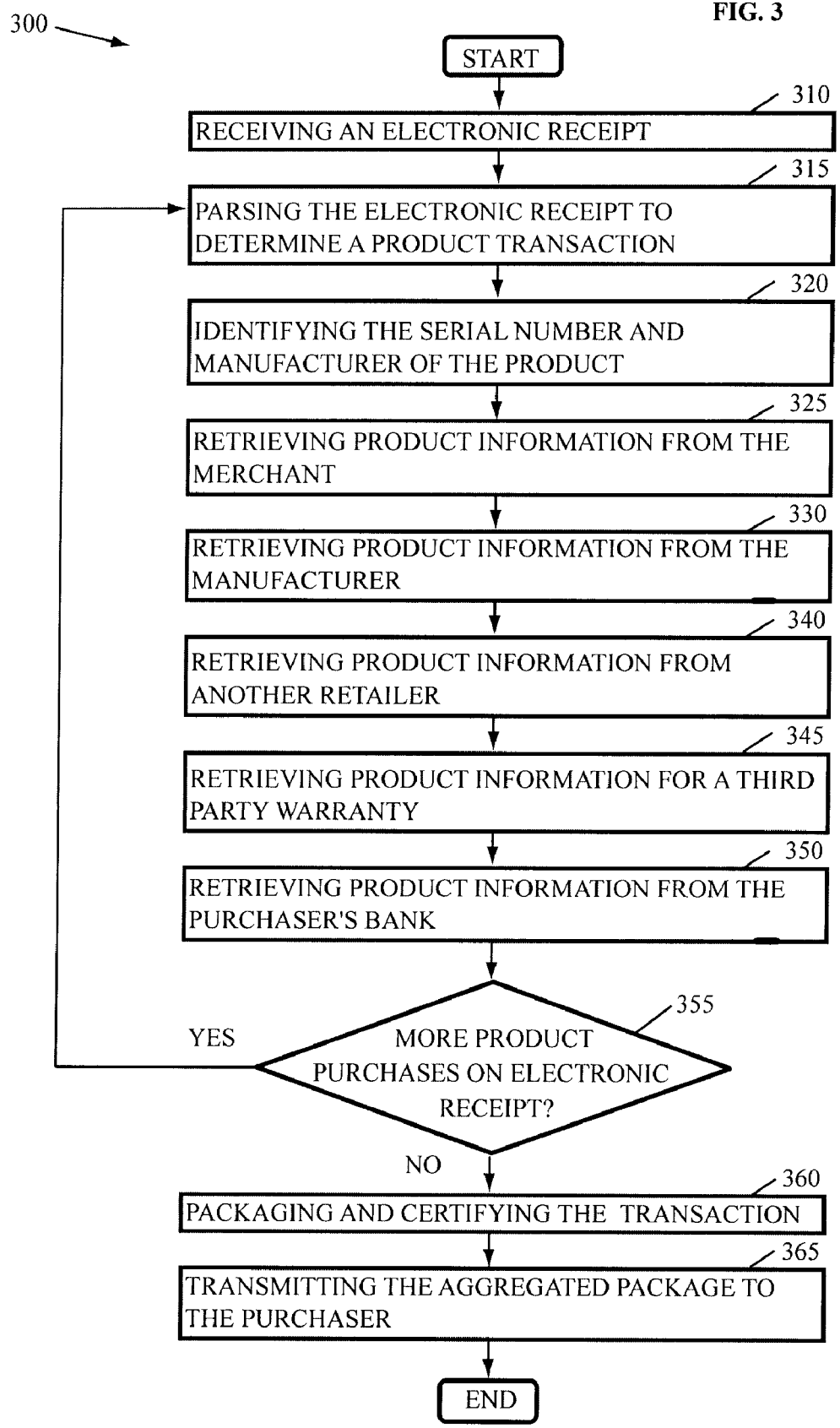

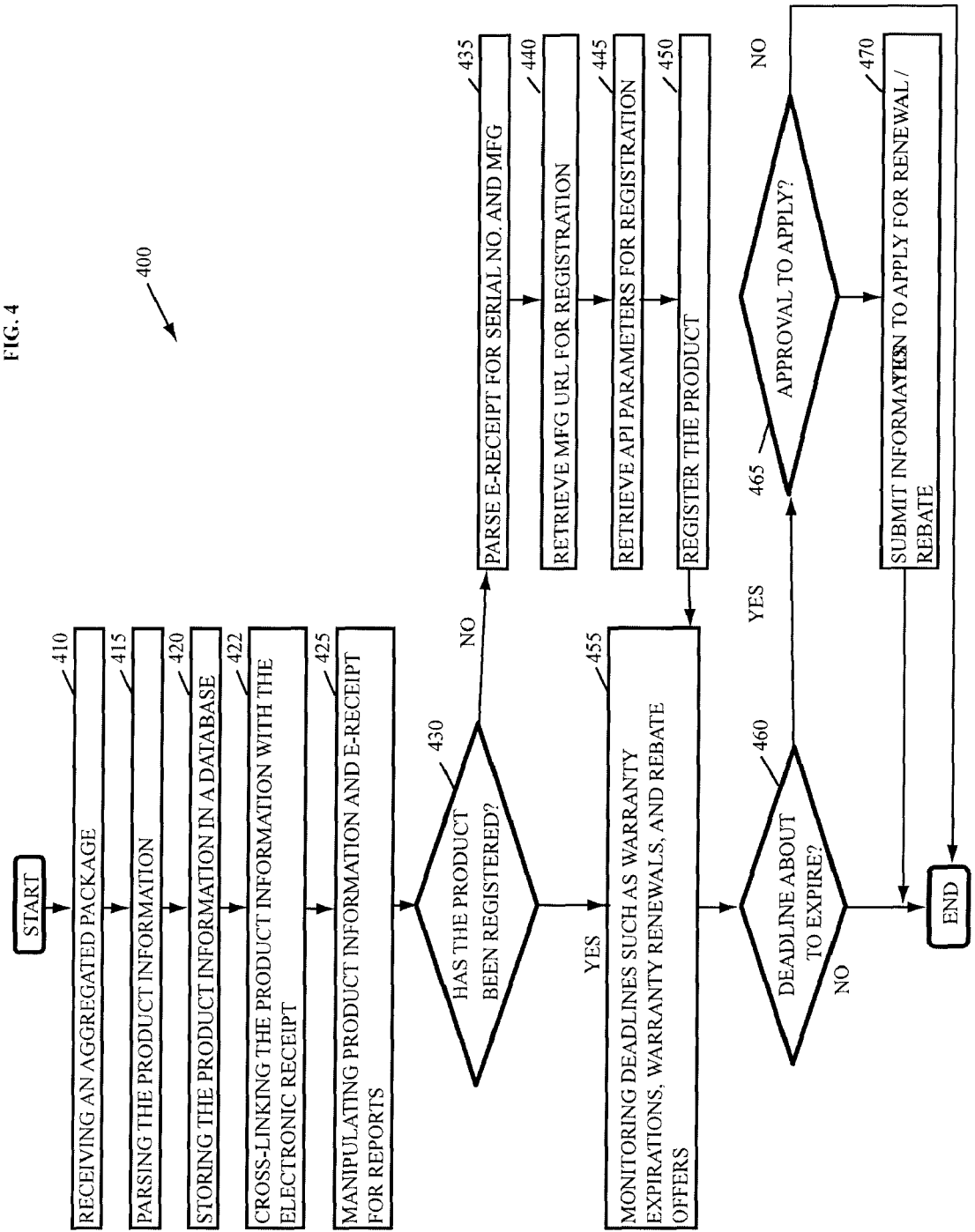

E-COMMERCE TRANSACTION AGGREGATION AND PROCESSING

CROSS-REFERENCES TO RELATED APPLICATIONS

This application is a divisional application of U.S. patent application Ser. No. 10/733,836, entitled "E-COMMERCE TRANSACTION AGGREGATION AND PROCESSING", filed Dec. 11, 2003 now U.S. Pat. No. 7,519,547, the disclosure of which is incorporated herein in its entirety for all purposes.

This application is related to U.S. patent application Ser. No. 10/733,838, entitled "E-COMMERCE BY CHECK", filed Dec. 11, 2003, the disclosure of which is incorporated herein in its entirety for all purposes.

This application is related to U.S. patent application Ser. No. 10/733,837, entitled "E-CHECK AND E-COMMERCE", filed Dec. 11, 2003, the disclosure of which is incorporated herein in its entirety for all purposes.

FIELD OF INVENTION

The present invention is in the field of e-commerce. More particularly, the present invention relates to methods, systems, and media to aggregate product information with electronic receipts into an aggregated package for the corresponding product and to process and manage the aggregated package for, e.g., enhancing functionality and utility of a personal finance manager such as Quicken™.

BACKGROUND

Current business processes for Point of Sale (POS) generate a "hard-copy receipt" or "electronic receipt" for the customer for every purchase. This POS process also generates receipts for the customers, merchants, and banks such as credit card companies when the purchase is made with a credit card. For example, a customer may purchase a product with a credit card from a merchant at the merchant's store or electronically via the merchant's web site. The merchant will process the credit card payment, electronically communicating with the credit card company to verify that the credit card company is willing to pay the amount of currency described by the merchant for the transaction. Once the transaction is authorized, an approval code is provided to the merchant and the merchant completes the transaction by providing the customer with a receipt that includes the product and some description to identify the form of payment and the credit card utilized for payment.

In addition to providing a purchaser with the product and a receipt for a product, the corresponding manufacturer and merchant try to provide supplementary and/or complementary product information such as warranties, warranty renewals, rebates, return policies, instruction manuals, accessories, locations of repair centers, and the like. Moreover, the purchaser also wants to receive much of this product information so it can be retained and used at the purchaser's convenience.

When the transaction transpires at the merchant's physical storefront, the merchant typically provides a "hardcopy" receipt for the transaction, possibly tossing advertisements and brochures describing the merchant's return policy, rebate policy, and warranty policy. Similarly, when the transaction is completed via the merchant's on-line store, the merchant automatically generates an email receipt that may include text that describes warranties, return policies, and provides a uniform resource locator (URL) link to the on-line store. By supplying the information to the purchaser at the time of the purchase, the merchant can provide the purchaser with the most up to date information at the time of the purchase.

The manufacture, on the other hand, must provide the product information such as product manuals, rebates, repair center locations, and possibly product accessory catalogs by inserting the hardcopies in the packaging for the product before the product is even shipped to the merchant, which could be months or years before the purchaser buys the product from the merchant. Further, since the manufacturer deals with large quantities of the same product, information like product manuals must be ordered in advance of packaging the product. In some cases, especially when considering products like software applications, the product may be updated or revised between the time that the product manual is printed and when the product is packaged. Thus, manufacturers may print inserts or fliers just before packaging the product to update information in the full product manuals. Unfortunately, the information such as manuals, rebates, and repair center locations, which are subject to change may be outdated to some extent when the purchaser needs to use them.

One solution for manufacturers is to include a URL in or on the packaging that directs the customer to a web site that has the latest version of, e.g., the product manual for use or download. With regard to many software products, in fact, the manufacturers may just provide a short, "getting started" manual to help the purchaser install the software and include within the software, links to instruction manuals, technical assistance, or the like.

Banks such as credit card companies may offer transaction rejection policies for the purchaser for transactions in which the bank was utilized for payment, allowing the purchaser to back out of transactions that were fraudulent, not authorized by the card holder, or that resulted in products that were defective or otherwise not fit for use. These policies may be included in the original agreement executed by the purchaser or in an updated agreement mailed out to the purchaser at a later date.

Further, many banks form alliances with merchants and/or manufacturers that allow the banks to offer discounts for purchases of related products such as accessories. As a result, banks tend to include product information to the purchaser in billing statements. Some information included in the billing statements is triggered upon recognition by banking software of the nature of the product or merchant that sold the product to the purchaser. For example, the purchaser may buy an item from The Sharper Image™ and the bank may be able to offer discounts on products available to the purchaser from The Sharper Image™. Thus, the bank prints coupons or advertisements related to the transaction in the billing statement.

Being bombarded with the product information from the merchants, manufacturers, and banks, in different formats and, at least with regard to the information from the bank, at different times, the purchaser must be very organized, filing the information in a manner that it will be accessible when needed. In many situations, the purchaser may lose track of the information or may even forget about certain policies received from the store, the bank, and/or the manufacturer at the time the policies are needed. For instance, the purchaser may purchase a television, receive an in-store warranty for a year and a manufacturer's warranty for three years. The manufacturer's warranty may be extendable within a few months of expiration and the purchaser, considering that a great offer, factor that extendable warranty in as a basis for purchasing the particular manufacturer's television. However, three years later, the purchaser may forget about the extendable warranty and forget to file the paperwork to extend the warranty since the television seems to be working great. A year later, after it's too late for the purchaser to extend the warranty, a part, previously under warranty, may fail, costing the purchaser significantly more than the price of extending the warranty.

SUMMARY OF THE INVENTION

The problems identified above are in large part addressed by methods, systems, and media to aggregate and process product information. One embodiment provides a method for processing an aggregated package for an e-commerce transaction. The method generally involves receiving, by a personal finance manager being executed via a computer, the aggregated package, wherein the aggregated package comprises an electronic receipt of a transaction to purchase a product from a merchant by a purchaser, an encrypted module to certify the trustworthiness of the electronic receipt, and product information associated with the product, wherein the product information comprises code designed to operate with the personal finance manager. The method also involves parsing, by the personal finance manager being executed by the computer, the product information to store data of the product information in a database based upon a category associated with the data. The method involves associating, by the personal finance manager being executed by the computer, the data with the electronic receipt. And the method involves managing, by the personal finance manager being executed by the computer, the product information to convey information related to the product to the purchaser, wherein managing comprises utilizing the code to automatically set up reminders associated with the aggregated package based upon the product information.

Some embodiments provide an apparatus for processing an aggregated package for an e-commerce transaction. The apparatus comprises one or more processor and a memory to store instructions and coupled to the one or more processor to execute the instructions. The instructions comprise a package receiver to receive the aggregated package, wherein the aggregated package comprises an electronic receipt for a transaction to purchase a product from a merchant by a purchaser, an encrypted module to certify the trustworthiness of the electronic receipt, and product information associated with the product, wherein the product information comprises code designed to operate with a personal finance manager of the apparatus. The instructions comprise a database to store the product information and a package parser coupled with the database to parse the product information to store data of the product information in the database based upon a category associated with the data, and to associate the data with the electronic receipt. And the instructions comprise a product information manager coupled with the database to manage the data to convey information related to the product to the purchaser, the product information manager to utilize the code to automatically set up reminders associated with the aggregated package based upon the product information.

Yet another embodiment provides a tangible machine-accessible storage medium containing instructions, which when executed by a machine, cause said machine to perform operations. The operations may involve. The operations comprise receiving, by a personal finance manager, the aggregated package, wherein the aggregated package comprises an electronic receipt for a transaction to purchase a product from a merchant by a purchaser, an encrypted module to certify the trustworthiness of the electronic receipt, and product information associated with the product, wherein the product information comprises code designed to operate with the personal finance manager. The operations comprise parsing, by the personal finance manager, the product information by category to store data of the product information in a database based upon a category associated with the data and associating, by the personal finance manager, the data with the electronic receipt. And the operations comprise managing, by the personal finance manager, the product information to convey information related to the product to the purchaser, wherein managing comprises utilizing the code to automatically set up reminders associated with the aggregated package based upon the product information.

BRIEF DESCRIPTION OF THE DRAWINGS

Other objects and advantages of the invention will become apparent upon reading the following detailed description and upon reference to the accompanying drawings in which, like references may indicate similar elements:

FIG. 3 depicts an example of a flow chart to generate an aggregated package; and FIG. 4 depicts an example of a flow chart to process an aggregated package.

DETAILED DESCRIPTION OF EMBODIMENTS

Figure 1:
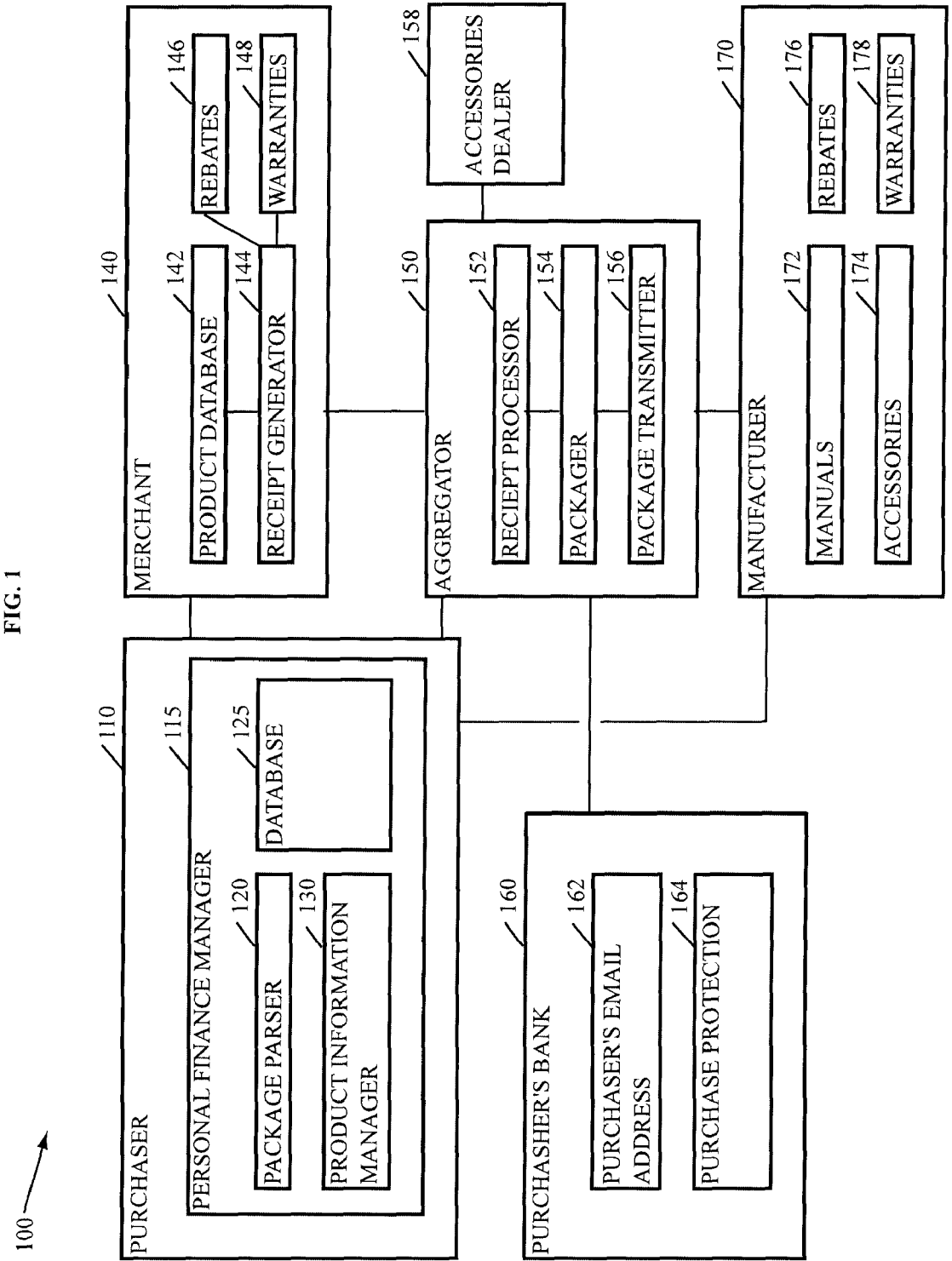
FIG. 1 depicts an embodiment of a system including an aggregator in communication with a merchant to aggregate product information from different sources and to provide the resulting aggregated package to the purchaser for management and processing by a personal finance manager (PFM)

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media for aggregating and processing product information are contemplated. Embodiments include hardware and/or software for receiving an electronic receipt from a merchant that describes a transaction for a product by a purchaser and gathering product information from one or more sources such as the merchant, the product's manufacturer, the purchaser's bank, and/or an accessories dealer. Upon gathering the product information, the product information is associated with the transaction for the product on the electronic receipt and packaged in a standard, electronic format, an aggregated package, that is accessible and manageable by the purchaser's software, such as a personal finance manager (PFM) like Quicken™, Quickbooks™, Microsoft Money™, or the like. The aggregated package can then be sent to the purchaser via an email address supplied by the purchaser at the time of the purchaser or by the purchaser's bank while completing a funds transfer for the transaction.

Once committed to a database of the purchaser's software, the purchaser not only knows where to access the information but may also perform, automatically if desired, advanced functions utilizing combinations of the data associated with the product. For example, the merchant from which the purchaser intends to purchase the product may have formed an agreement with one or more sources to aggregate product information with receipts for transactions. The manufacturer may supply the merchant with electronic product information such as warranty information, a URL for a warranty renewal and instructions and data to interact with the manufacturer's registration web site. Then, after the purchaser buys the product from the merchant, the merchant may aggregate or instruct a third party to aggregate the product information from the manufacturer with the electronic receipt generated for the transaction and to forward the aggregated package to the purchaser.

Upon receipt of the aggregated package, the purchaser's PFM may parse the aggregated package, separating information for the transaction for the product into respective databases for the PFM and associate the data with the transaction. The PFM may then execute the instructions for product registration, gathering the serial number, the model number, and the date of the purchase for the product, as needed, and transmit the registration information the manufacturer. In some cases, the date of registering may also be stored so the purchaser retains record of the registration of the product, which often allows the purchaser to take advantage of additional services like technical support for the product. If those additional services expire, the instruction from the manufacturer may also include instructions to retrieve or calculate the expiration based upon the date of successful registration as well as instructions to set up reminders for the purchaser, informing the purchaser when such services will expire and how to contact the manufacturer or the manufacturer's agent to extend the services.

Turning now to the drawings, FIG. 1 depicts an embodiment of a system 100 to aggregate, manage and process product information related to a transaction. More specifically, system 100 may include a purchaser 110, a merchant 140, an aggregator 150, an accessories dealer 158, a purchaser's bank 160, and a manufacturer 170. For example, purchaser 110 may include a customer and/or a computer that a customer uses to purchase a product from merchant 140 and to receive an aggregated package from aggregator 150. In particular, purchaser 110 may transact with merchant 140 over the Internet, purchasing a product from the merchant via the merchant's web site.

Purchaser 110 may have a personal finance manager 115 to track purchases of products as well as product information such as warranties, rebates, manufacturers, accessories, and URLs therefor. For example, purchaser 110 may buy a product from merchant 140 via the merchant's web site. The merchant, having contracted with aggregator 150 to enhance receipts from transactions, receives the electronic receipt for the product. Based upon information about the product provided in and/or with the receipt, aggregator 150 gathers information related to the product from various sources such as merchant 140 (to the extent that the merchant maintains product information that was not included with the electronic receipt), an accessories dealer 158, a manufacturer 170, and the purchaser's bank 160.

Personal finance manager 115 may include a package parser 120, a database 125, and a product information manager 130. Package parser 120 searches the aggregated package for inclusion of various types of data as well as associations between the data and transactions itemized on the electronic receipt, to consistently categorize and store the data in database 125. For instance, package parser 120 may locate a rebate form for the product that was supplied by manufacturer 170 and associate the rebate form not only with the serial number, model number, and purchase date from the electronic receipt but also with the URL or email address to which the rebate form must be transmitted to apply for the rebate. In some embodiments, the purchaser 110 may decide to automate the filing for rebates and personal finance manager 115 may accommodate by locating and filing for rebates in response to receiving an aggregated package.

Product information manager 130 may manipulate and manage product information received in the aggregated package. More specifically, product information manager 130 may facilitate perusal of the product information related to a transaction by providing an interface to display product information based upon associations between the product information and the electronic receipt. Further, product information manager 130 may set reminders, tasks, calendar events, and the like based upon product information received in conjunction with an electronic receipt for a transaction. For example, merchant 140 may supply a limited warranty that lasts 30 days from the date of purchase and the warranty may be extendable so long as the extension is purchased prior to the expiration of the warranty. As a result, product information manager 130 may locate the purchase date and add 30 days to determine when the original warranty is due to expire. Prior to the expiration, personal finance manager 115 may notify the purchaser of the pending expiration, giving the purchaser 110 adequate notice and time to renew the warranty if that is desirable.

Merchant 140 represents the seller, the seller's point of sale (POS) terminal, and computer systems or databases that the seller has made available to the POS terminal for supplying the electronic receipt and, in some embodiments, product information to aggregator 150. More specifically, merchant 140 may include a product database 142, a receipt generator 144, rebates 146, and warranties 148. When purchaser 110 brings a product to the cashier at a POS terminal in a store, the uniform product code (UPC) or a similar product code is scanned and compared with entries in product database 142 to determine the model number and manufacturer of the product. Then, the last couple digits of the serial number or the full serial number may be entered into the POS terminal to select identify the product. Alternatively, merchant 140 may implement an enhanced product code that identifies the manufacturer, model number, and serial number of the product when the product is scanned at the POS terminal.

Product database 142 may also associate the product with any rebates 146 and warranties 148 that merchant 140 intends to offer purchasers of the product. Receipt generator 144 receives the product information for each product associated with the transaction between purchaser 110 and merchant 140, as well as the payment information, and generates an electronic receipt. In some embodiments, the electronic receipt is generated upon verification of payment by the purchaser's bank 160. In other embodiments, the electronic receipt is generated substantially concurrently with verification of payment from purchaser 110. For example, merchant 140 may supply aggregator 150 with payment information. Then, aggregator 150 may communicate with purchaser's bank 160 or another party to verify the purchaser's credit worthiness or the availability of funds for the transaction and, upon verification, receipt processor 152 may receive the electronic receipt from merchant 140.

In such situations, aggregator 150 may also certify the authenticity of the electronic receipt. In particular, aggregator 150 can certify that funds have been transferred from purchaser's bank 160 to merchant 140 for the products itemized in the electronic receipt by associating an encrypted module with the electronic receipt. The encrypted module may include encoded information about the transaction and be sufficiently unalterable such that the module is legally considered evidence of the funds transfer for the transaction and acceptable to merchants and manufacturers as proof of the purchase, advantageously reducing the hardship involved with mailing the UPC labels off the packaging of the corresponding products for, e.g., rebates. In some embodiments, the manufacturer or merchant may rely on aggregator 150 to verify the content of the electronic receipt and that the encrypted module and/or electronic receipt has not been tampered with.

The electronic receipt may be accompanied by product information such as rebates 146 and warranties 148 offered by the merchant and/or other parties like manufacturers with which merchant 140 has established agreements to provide the information to purchaser 110. Receipt processor 152 then determines whether additional information should be gathered. In particular, aggregator 150 may be an entity that is part of, associated with, or distinct from merchant 140. In situations wherein aggregator 150 is distinct from merchant 140, for instance, merchant 140 may contract with aggregator 150 for a level of service associated with supplying product information to purchaser 110. At a minimum, aggregator 150 may receive additional product information from merchant 140, packager 154 may consolidate and organize that information into an aggregated package for purchaser 110, and package transmitter 156 may transmit the aggregated package to purchaser 110 in a format that is compatible with PFM 115.

On the other hand, aggregator 150 may gather product information from multiple sources such as an accessories dealer 158, the purchaser's bank 160, and manufacturer 170. For instance, aggregator 150 may develop separate contracts with each supplier of product information and selectively include the product information in the aggregated package for purchaser 110 based upon an agreement with merchant 140. Accessories dealer 158 may include a database to match the product involved in a transaction between purchaser 110 and merchant 140 with compatible accessories such as a carrying case, trackball, keyboard, monitor, software, and the like for a particular model of a laptop computer. In several embodiments, model numbers and manufacturers of products associated with the transaction may be sent to the accessories dealer 158 and accessories dealer 158 may even be able to recognize combinations of purchases to suggest additional accessories that may be relevant. For example, a purchaser 110 may buy a photo printer, a desktop computer, a monitor, and photo-editing software, and accessories dealer 158 may determine that purchaser 110 is buying a new computer installation for work on graphics. In response, accessories dealer 158 may identify one or more graphics acceleration cards that are compatible with the desktop computer and submit that information to aggregator 150 for inclusion in the aggregated package.

In other situations, aggregator 150 may only supply selected model numbers from a transaction to a source of product information such as manufacturer 170 based upon terms of the agreement between manufacturer 170 and aggregator 150. For example, manufacturer 170 may only be interested in supplying product information related to products developed by manufacturer 170. Thus, when purchaser 110 buys accounting software, the manufacturer 170 of the accounting software may supply product information to aggregator 150 including manuals 172, accessories 174, rebates 176, and warranties 178.

Manuals 172 may include, for instance, a URL to download the latest instruction manual for the accounting software. Accessories 174 may include a URL to a web site that sells the latest accessories developed by manufacturer 170 such as software modules to improve efficiency when applying the accounting software to a specific business type, or to offer additional forms for one or more different business types.

Rebates 176 may include rebate offers by manufacturer 170 and a rebate interface for PFM 115 to apply for a rebate. More specifically, rebates 176 may include data describing a rebate offer and, in some embodiments, code designed to operate with PFM 115 to set up reminders and to interface with a web site associated with manufacturer 170 to apply for the rebate. For example, a rebate may be offered for the purchase of a computer and monitor on the same receipt. Aggregator 150 may certify the electronic receipt for the transaction and transmit the aggregated package to PFM 115. PFM 115, based upon interactions with or prior instructions from purchaser 110, may then communicate with manufacturer 170 to apply for the rebate.

In some embodiments, particularly when aggregator 150 is involved with funds verification or credit worthiness of purchaser 110, aggregator 150 may interact with purchaser's bank 160 to obtain an electronic address to deliver the aggregated package such as purchaser's email address 162. In several of these embodiments, aggregator 150 may also interact the purchaser's bank 160 to determine purchase protection policies such as a money-back guaranty that the purchaser's bank offers when the purchaser 110 buys a product utilizing, e.g., a credit card issued by purchaser's bank 160.

Figure 2:
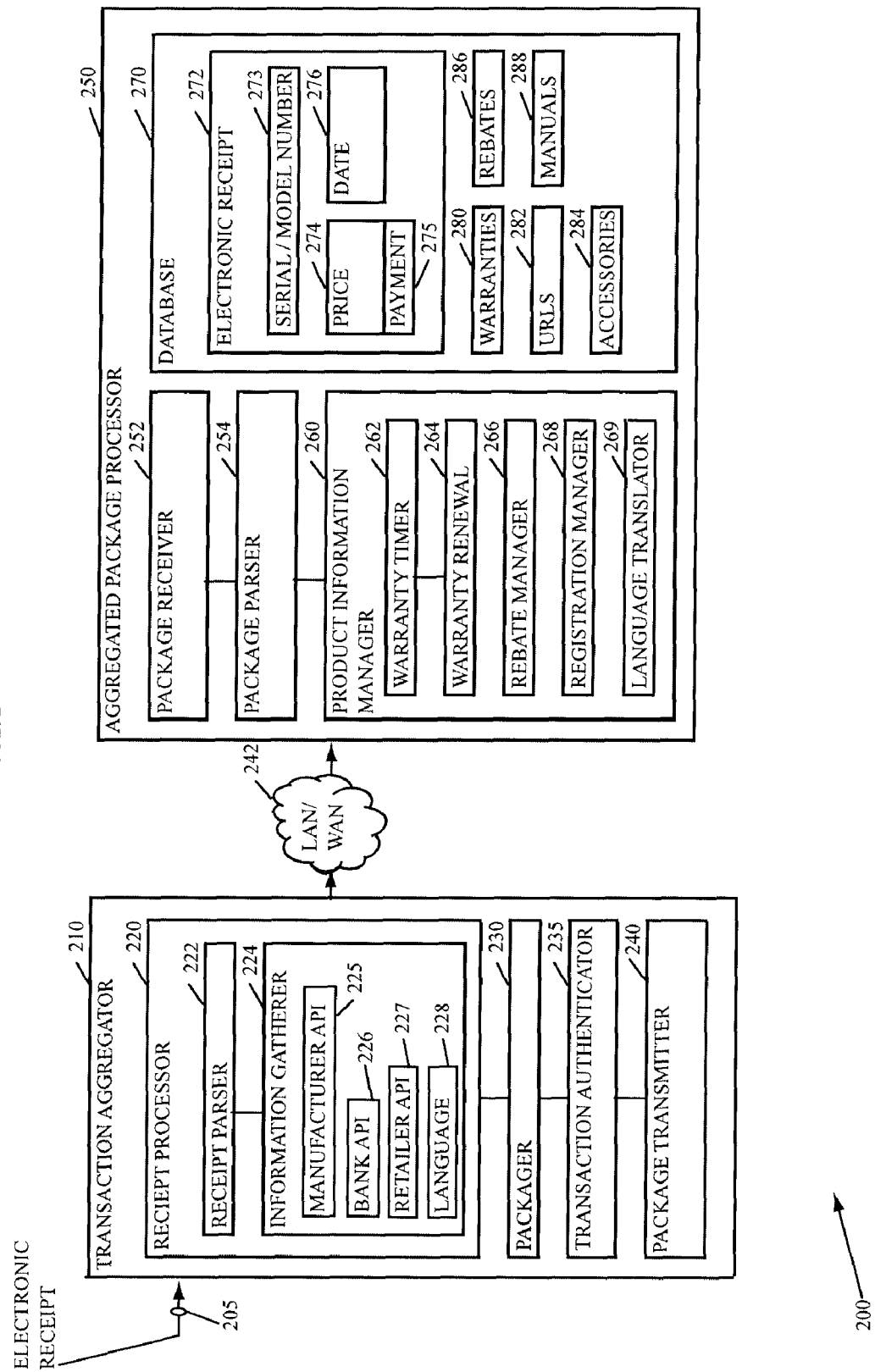
FIG. 2 depicts an embodiment of a transaction aggregator and an aggregated package processor to aggregate, process and manage product information in conjunction with an electronic receipt.

FIG. 2 depicts an embodiment of a system 200 to aggregate, process, and manage product information in conjunction with an electronic receipt. System 200 includes hardware and software adapted to generate an aggregated package based upon an electronic receipt 205, to transmit the aggregated package to an aggregated package processor 250 via a local area network and/or wide area network (LAN/WAN) 242, and to manage the product information for the purchaser.

Transaction aggregator 210 may aggregate product information associated with electronic receipt 205 in response to receiving electronic receipt 205. In particular, transaction aggregator 210 includes receipt processor 220, packager 230, transaction authenticator 235, and package transmitter 240. Receipt processor 220 may receive the electronic receipt 205 and, based upon the service level associated with the requestor of the aggregation and the amount of product information provided in conjunction with electronic receipt 205, determine the amount of information to gather and package with electronic receipt 205. For example, a merchant may contract with a third party, transaction aggregator 210 to provide purchasers with a level of service that is requested by the purchaser at checkout. For instance, for an extra few cents per product or an extra dollar, the merchant may request that receipt processor 220 provide all product information related to rebates, warranties, purchase protection, electronic manuals, accessories, and URL's therefore. On the other hand, the purchaser may choose to pay less and receive rebates and warranties from the merchant and manufacturer.

Receipt parser 222 searches through the electronic receipt 205 to identify transactions or at least transactions subject to aggregation. More specifically, aggregation may only be offered for items above a minimum price or different levels of service may be offered dependent upon the nature of the product purchased in the transaction. For example, a phone cord may have a limited warranty against defects and the merchant may offer a return policy that allows the purchaser to return the phone cord within 30 days. Receipt parser 222 may identify the transaction for the phone cord and submit the transaction directly to packager 230, whereas, receipt parser 222, upon identifying a transaction for a stereo, may instruct information gatherer 224 to gather additional product information from the manufacturer and/or the purchaser's bank. In many of these embodiments, receipt parser 222 distinguishes the transactions and determines how to handle the transaction based upon indications included by the merchant. In other embodiments, receipt parser 222 may compare the UPC number of the product against a product database or a database supplied by the corresponding merchant to determine whether and from which electronic addresses, information should be aggregated with electronic receipt 205.

Information gatherer 224 gathers product information from different sources to generate an aggregated package for a transaction. In particular, information gatherer 224 includes a manufacturer application program interface (API) 225, bank API 226, retailer API 227, and language 228. Manufacturer API 225 may interact with a manufacturer's server via an Internet protocol (IP) address to gather product information about a product that is the subject of a transaction on electronic receipt 205. Manufacturer API 225 may, for instance, interact with a web site associated with the manufacturer to determine accessories associated with the product, rebates offered by the manufacturer for the product, warranties and warranty renewals offered by the manufacturer, and the like. In some embodiments, the manufacturer may even offer code or instructions in a standard format or different code or instructions for popular PFM formats, which, when loaded by aggregated package processor 250, instruct aggregated package processor 250 to set up reminders to renew a warranty, register for a rebate, or the like.

Bank API 226 may interact with a purchaser's bank or other banks related to the transaction, the product, the merchant, the purchaser, or transaction aggregator 210, to aggregate product information with electronic receipt 205 for the purchaser. For instance, the purchaser's bank may have a credit card that offers loyalty points for an airline and that information may be aggregated into the aggregated package when the purchaser buys a ticket for that airline or for another airline.

Retailer API 227 may interact with a merchant's server that is associated with the transaction, or another retailer that offers the same product, accessories for the product or other related items. For instance, transaction aggregator 210 may offer the aggregation service for free to merchants and pay for the service by including advertisements for similar retailers or retailers associated with accessories for the product. By charging the accessories retailer for the advertisement, transaction aggregator 210 can offer the aggregation service to more merchants. On the other hand, the corresponding merchant may pay to prevent inclusion of advertisements from other retailers for products that the merchant offers.

Language 228 may include a software module designed to gather information for the aggregated package in a language based upon a language preference selected by a purchaser at the time of purchaser, the purchaser's bank, or the merchant. For instance, when the purchaser, an English speaking person, transacts with a merchant in Japan, the purchaser may not be able to speak Japanese and, in any case, may not want a receipt or information such as an instruction manual in Japanese. Further, if no language is selected, language 228 may default to collection of a standard set of languages such as English, Spanish, German, French, Japanese, and Russian. In other embodiments, the default language, or languages may be selected based upon the location of the purchaser, the purchaser's bank, and/or the merchant.

Packager 230 may prepare the aggregated package with the electronic receipt 205 and the product information associated with transactions of the electronic receipt 205. In particular, packager 230 may format the aggregated package in a standard format that is accessible to an aggregated package processor 250. For instance, aggregated package processor 250 may be able to convert the contents of the aggregated package into a format that is parsable or may be able to parse the standard format. In other embodiments, packager 230 may interact with aggregated package processor 250 via package transmitter 240 to determine an appropriate format for the aggregated package and package the product information accordingly.

Some embodiments include transaction authenticator 235. Transaction authenticator 235 may generate an encrypted module to authenticate or certify the trustworthiness of an electronic receipt 205 that is created for a purchaser. Transaction authenticator 235 may encrypt electronic receipt 205, a hash of electronic receipt 205, an encoded hash of electronic receipt 205, and/or the like to gain the trust of manufacturers and even courts of law regarding the trustworthiness of the content of electronic receipt 205 so the purchaser may present electronic receipt 205 and the encrypted module as evidence of a transaction and the corresponding funds transfer. For example, upon receipt of electronic receipt 205, electronic receipt 205 is encrypted and cannot be modified by the purchaser, thus ensuring their authenticity for such purposes as proof of purchase and tax deductions. The purchaser can then control where electronic receipt 205 is stored and when it can be accessed.

Package transmitter 240 may transmit the aggregated package to an address associated with the purchaser and, in several embodiments, interact with the purchaser's aggregated package processor 250 such as a PFM or similar software to format the aggregated package in a format that can be utilized by aggregated package processor 250 and, thus, the corresponding purchaser.

Package transmitter 240 may transmit the aggregated package to the purchaser via LAN/WAN 242. LAN/WAN 242 is a network connection to couple transaction aggregator 210 with aggregated package processor 250 to transmit an aggregated package based upon the electronic receipt 205. In some embodiments, LAN/WAN 242 may include a network in an office coupled via Ethernet, optical media like OptiConnect, or the like. In several embodiments, LAN/WAN 242 also couples with the Internet via a cable modem, a direct subscriber line (DSL), a T1 line, a T3 line, or the like. In further embodiments, LAN/WAN 242 may include a network of temporary connections such as connections via a telephone system.

Aggregated package processor 250 may process and manage data, and possibly code, included in an aggregated package. In particular, aggregated package processor 250 includes a package parser 254, a product information manager 260, and a database 270. Package parser 254 may search through the aggregated package to read and store product information and information of electronic receipt 205 in different categories of the database 270 or even in different categories of databases. In some embodiments, an information exchange between package transmitter 240 and aggregated package processor 250 informs transaction aggregator 210 of the format that can be parsed by aggregated package processor 250. For example, package parser 254 may store electronic receipt 205 in electronic receipt 272, organizing the transaction data associated with electronic receipt 205 into categories including serial/model number 272, price 274, payment 275, and date 276. Then, package parser 254 may parse the corresponding product information, associating the product information with electronic receipt 272, such as warranties 280, URLs 282, accessories 284, rebates 286, and manuals 288, and the details of the transaction from the electronic receipt 205.

Product information manager 260 may utilize the data and code stored in database 270 to inform the purchaser of deadlines, facilitate completion of rebate applications and to facilitate registration of products. More specifically, product information manager 260 may include logic such as warranty timer 262, warranty renewal 264, rebate manager 266, registration manager 268, and language translator 269. Warranty timer 262 may review warranty information parsed from the aggregated package and stored in database 270. For example, when a transaction is associated with a warranty, a timer event may be instituted to inform the purchaser when that warranty is about to expire.

Similarly, warranty renewal 264 may recognize data related to renewing a warranty for a product through a manufacturer of the product, the merchant that sold the product to the purchaser, or through a third party that offers, e.g., product insurance for the product. The notification may triggered such that the purchaser has sufficient time to effect the renewal. In some embodiments, warranty renewal 264 can utilize code or instructions and an IP address included with the renewal to interface with the entity offering the renewal and supply information to apply for the renewal from database 270 such as the serial/model number 273 and the date 276 of the transaction.

Rebate manager 266 may track rebates 286 for products described in transactions associated with electronic receipt 272. Rebate manager 266 may automatically apply for a rebate if the purchaser has set preferences indicating a desire for automatic application for rebates. This is particularly true in instances wherein an encrypted module is included by transaction authenticator 235 and utilized as proof of the transaction. For example, rebate manager 266 may advantageously transmit the encrypted module along with the electronic receipt to the corresponding manufacturer or merchant, and/or to transaction aggregator 210 as a proof of the purchase rather than physically mailing the UPC included on the package of the product.

Otherwise, rebate manager 266 may set reminders for various rebates to remind the purchaser of the availability of the rebate. For example, the purchaser may buy a computer. A rebate associated with the purchase of the computer may effectively provide a discount for the purchase of a software application. When the purchaser does not purchase the software application at the time the computer is purchased, rebate manager 266 may notify the purchaser that the rebate is available for the software and offer to direct the purchaser to a web site that sells the software (if such a URL is included in the aggregated package). If the purchaser does not purchase the software at that time, rebate manager 266 may set another reminder for a later date.

Registration manager 268 may track registrations for products, gather data to file registrations, and register the products automatically if the purchaser so desires. For example, upon receiving an aggregated package, packager parser 254 locates data related to registering the product such as the date 275 of the transaction and the serial/model number 273, and submits the data in a format and to a URL indicated by the instructions or code received with the registration.

Language translator 269 may, based upon a preference set by the purchaser, translate the contents of aggregated packages. In particular, an aggregated package processor purchased in Sweden may, by default, translate the language of the contents of aggregated packages to Swedish upon receipt if the contents are not already written in Swedish. However, the purchaser may prefer to receive all aggregated package contents in English so language translator 269 may translate the contents of the aggregated package to English. In some embodiments, language translator 269 may include translation software. In further embodiments, language translator 269 may interact with a language translation API via LAN/WAN 242 to translate the contents of the aggregated package.

In further embodiments, transaction aggregator 210 and aggregated package processor 250 may be included in the same software package. In some of these embodiments, the software package may be adapted to reside on the purchaser's computer. In other embodiments, the software package may be adapted to reside on a server that is accessible to the purchaser, e.g., under a service agreement.

Referring now to FIG. 3, there is shown an example of a flow chart 300 for aggregating product information. Flow chart 300 begins with receiving an electronic receipt (element 310). In particular, a merchant may generate an electronic receipt, such as a receipt typically forwarded to a purchaser by email, using extensible markup language (XML) tags to identify transactions as well as attributes of each transaction like the price of the products, model numbers and serial numbers, the manufacturers of the product, and similar information. The merchant may then transmit that electronic receipt to an aggregator to generate an aggregated package. In some embodiments, the aggregator may be a server within the merchants network. In other embodiments, the merchant may communicate with the server via a WAN like the Internet.

After receiving the electronic receipt, the aggregator parses the receipt for information to determine transactions for products (element 315) as opposed to tax items and possibly items for which no additional product information will be gathered. For example, the electronic receipt may include a transaction for a printer. The printer may be identified by a serial number and associated with its manufacturer (element 320).

The aggregator may then retrieve the product information from a variety of sources. The aggregator may retrieve product information from the merchant that sold the product (element 325) such as rebates and warranties offered by the merchant and product information from the manufacturer of the product (element 330) such as a URL for the manual, a URL for additional fonts, a URL for updates of driver software, and also rebates and warranty information for the product. Further, the aggregator may retrieve accessory information from an accessory dealer (element 340), third party warranty or warranty extension information (element 345), and purchase protection information from the purchaser's bank (element 350). For example, when the purchaser buys a camera from the merchant, the aggregator may retrieve sales information for video tapes, memory modules, or mini compact discs, depending upon the camera's serial number or model number. In some of these embodiments, the aggregator may supply, e.g., the model number to a retailer of accessories, which has an agreement in place with the aggregator, and the retailer may match the model number with accessories sold by the retailer. Those accessories, or a URL to reach an on-line store that sells those accessories, may then be returned by the retailer to the aggregator to be included within the aggregated package for the purchaser.

After the product information for a product is gathered, additional products from the electronic receipt are identified and the product information associated with each product is gathered (element 360). The product information for all the products or for selected products on the electronic receipt may then be packaged with the electronic receipt in an aggregated package and certified (element 360) so that the electronic receipt can be used as a proof of purchase for the corresponding products. The aggregator may then transmit the aggregated package to the purchaser.

Referring now to FIG. 4, there is shown an example of a flow chart 400 for processing and managing product information. Flow chart 400 begins upon receipt of an aggregated package (element 410) from an aggregator such as transaction aggregator 210 in FIG. 2. In particular, the purchaser may receive an email having an email attachment that is an aggregated package for a transaction that recently transpired. In some situations, rather than receiving an email, the aggregator may initiate communication with an aggregated package processor on the purchaser's computer, or the purchaser may access a web site associated with the aggregator to download the aggregated package.

Upon receipt of the aggregated package, the package is parsed (element 415) to identify information about transactions, encrypted modules or other types of certifications, and product information associated with products involved with the transactions. The data can then be stored in a database (element 420) and cross-linked with the electronic receipt (element 422) to facilitate management of the product information by the purchaser.

Management of the product information may involve manipulation of the product information and the e-receipt to display reports (element 425) such as tax reports, asset reports, and other financial or inventory reports, as well as to file product registrations and renew warranties. For example, when the product is received and the product has not been registered (element 430), the purchaser may want to register the product. The aggregated package processor, such as a PFM, may parse the electronic receipt, or e-receipt, to determine the serial number and manufacturer for the product (element 435). The PFM may further parse the aggregated package to notify the purchaser's insurance company about the acquisition of the purchased items in order to effect insurance coverage for the purchased items. The product information may then be parsed to determine the URL associated with registration of the product (element 440) as well as API parameters for registering the product (element 445) at the web site identified by the URL. The API parameters may, for instance, describe an order of transmission for the registration information and/or a format for submission of the information. On the other hand, the URL may be retrieved from a look-up table based upon identification of the manufacturer (element 440). With the URL and product information, the product may be registered (element 450).

After the product of a transaction is registered, management of the product information may involve monitoring deadlines such as warranty expirations, warranty renewals, and rebate offers (element 455) to notify the purchaser in time for the purchaser to take advantage of such offers. More specifically, when a deadline is about to expire (element 460), management of the product information may involve notifying the purchaser with a request for approval to renew the warranty or apply for the rebate (element 465). If the purchaser approves, then the information for the rebate or warranty renewal can be gathered from a database and submitted to apply for the renewal or rebate (element 470). Otherwise, the purchaser may be asked if notification should continue until the deadline has passed.

One embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media to aggregate, process, and manage product information. It is understood that the form of the invention shown and described in the detailed description and the drawings are to be taken merely as examples. It is intended that the following claims be interpreted broadly to embrace all the variations of the example embodiments disclosed.

What is claimed is:

1. A method for processing an aggregated package for an e-commerce transaction, the method comprising:

receiving, by a personal finance manager being executed via a computer, the aggregated package, wherein the aggregated package comprises an electronic receipt of a transaction to purchase a product from a merchant by a purchaser, an encrypted module to certify the trustworthiness of the electronic receipt, and product information associated with the product, wherein the product information comprises code designed to operate with the personal finance manager;

parsing, by the personal finance manager being executed via the computer, the product information to store data of the product information in a database based upon a category associated with the data;

associating, by the personal finance manager being executed via the computer, the data with the electronic receipt; and managing, by the personal finance manager being executed via the computer, the product information to convey information related to the product to the purchaser, wherein managing comprises utilizing the code to automatically set up reminders associated with the aggregated package based upon the product information.

2. The method of claim 1, further comprising translating the product information based upon a selected language.

3. The method of claim 1, wherein managing the product information comprises monitoring an expiration of a warranty of the product and notifying the user about the expiration and interacting with the user to renew the warranty.

4. The method of claim 1, wherein managing the product information comprises notifying an insurance company about the product to insure the purchaser against a loss of the product.

5. The method of claim 1, wherein managing the product information comprises automatically registering the product with a manufacturer associated with the product in response to receiving the aggregated package, based upon product identification data from the electronic receipt and rebate information from the product information, wherein the product information comprises the rebate information.

6. The method of claim 1, wherein managing the product information comprises automatically transmitting a rebate request to a manufacturer associated with the product in response to receiving the aggregated package, based upon product identification data from the electronic receipt and rebate information from the product information, wherein the product information comprises the rebate information.

7. The method of claim 1, wherein managing the product information comprises downloading a manual associated with the product based upon an Internet protocol address in the aggregated package.

8. An apparatus for processing an aggregated package for an e-commerce transaction, the apparatus comprising:
   one or more processor; and
   a memory to store instructions and coupled to the one or more processor to execute the instructions, the instructions comprising:
   a package receiver to receive the aggregated package, wherein the aggregated package comprises an electronic receipt for a transaction to purchase a product from a merchant by a purchaser, an encrypted module to certify the trustworthiness of the electronic receipt, and product information associated with the product, wherein the product information comprises code designed to operate with a personal finance manager of the apparatus;
   a database to store the product information;
   a package parser coupled with the database to parse the product information to store data of the product information in the database based upon a category associated with the data, and to associate the data with the electronic receipt; and
   a product information manager coupled with the database to manage the data to convey information related to the product to the purchaser, the product information manager to utilize the code to automatically set up reminders associated with the aggregated package based upon the product information.

9. The apparatus of claim 8, further comprising a language translator to translate content of the aggregated package based upon a selected language.

10. The apparatus of claim 9, wherein the product information manager comprises a warranty monitor to monitor warranty expiration dates for the product and to notify the purchaser about the expiration date.

11. The apparatus of claim 9, wherein the product information manager comprises a product registration manager to automatically register the product with a manufacturer associated with the product in response to receiving the aggregated package, based upon product identification data parsed from the electronic receipt and rebate information parsed from the product information, wherein the product information comprises the rebate information.

12. The apparatus of claim 9, wherein the product information manager is configured to download a manual associated with the product based upon an Internet protocol address parsed from the product information.

13. The apparatus of claim 8, wherein the product information manager comprises a rebate manager to automatically transmit a rebate request to a manufacturer associated with the product, based upon the electronic receipt and the data, in response to receiving the aggregated package.

14. A tangible machine-accessible storage medium containing instructions, which when executed by a machine, cause said machine to perform operations, comprising:
   receiving, by a personal finance manager, the aggregated package, wherein the aggregated package comprises an electronic receipt for a transaction to purchase a product from a merchant by a purchaser, an encrypted module to certify the trustworthiness of the electronic receipt, and product information associated with the product, wherein the product information comprises code designed to operate with the personal finance manager;
   parsing, by the personal finance manager, the product information by category to store data of the product information in a database based upon a category associated with the data;
   associating, by the personal finance manager, the data with the electronic receipt; and
   managing, by the personal finance manager, the product information to convey information related to the product to the purchaser, wherein managing comprises utilizing the code to automatically set up reminders associated with the aggregated package based upon the product information.

15. The tangible machine-accessible storage medium of claim 14, wherein managing comprises monitoring an expiration of a warranty for the product and notifying the user about the expiration.

16. The tangible machine-accessible storage medium of claim 14, wherein managing comprises notifying an insurance company about the product to insure the purchaser against a loss of the product.

17. The tangible machine-accessible storage medium of claim 14, wherein managing comprises registering the product with a manufacturer associated with the product, based upon a product identification in the electronic receipt and rebate information from the data, wherein the data comprises the rebate information.

18. The tangible machine-accessible storage medium of claim 14, wherein managing comprises automatically transmitting a rebate request to a manufacturer associated with the product, based upon a product identification in the electronic receipt and rebate information from the data, wherein the data comprises the rebate information.

19. The tangible machine-accessible storage medium of claim 14, wherein managing comprises downloading a manual associated with the product based upon an Internet protocol address in the aggregated package.

* * * * *